United States Patent
Kaplan et al.

(10) Patent No.: US 9,296,338 B2
(45) Date of Patent: Mar. 29, 2016

(54) VEHICLE MIRROR ADJUSTMENT

(71) Applicants: David Kaplan, Modi'in (IL); Tomer Rider, Naahryia (IL); Aviv Ron, Nir Moshe (IL); Shahar Taite, Kfar Saba (IL)

(72) Inventors: David Kaplan, Modi'in (IL); Tomer Rider, Naahryia (IL); Aviv Ron, Nir Moshe (IL); Shahar Taite, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 14/188,133

(22) Filed: Feb. 24, 2014

(65) Prior Publication Data
US 2015/0239398 A1    Aug. 27, 2015

(51) Int. Cl.
| | | |
|---|---|---|
| B60R 22/00 | (2006.01) | |
| G02B 5/08 | (2006.01) | |
| H04N 7/18 | (2006.01) | |
| B60R 1/00 | (2006.01) | |
| B60R 1/02 | (2006.01) | |
| G06T 7/00 | (2006.01) | |
| G06F 3/01 | (2006.01) | |

(52) U.S. Cl.
CPC ............... B60R 1/006 (2013.01); B60R 1/025 (2013.01); G06F 3/013 (2013.01); G06T 7/004 (2013.01); *G06T 2207/30041* (2013.01); *G06T 2207/30268* (2013.01)

(58) Field of Classification Search
USPC ............................. 701/49; 359/843; 348/148
See application file for complete search history.

(56) References Cited

U.S. PATENT DOCUMENTS

| | | | | |
|---|---|---|---|---|
| 7,373,249 | B2 * | 5/2008 | Ivanov | 359/843 |
| 9,073,493 | B1 * | 7/2015 | Yun et al. | |
| 2006/0158757 | A1 * | 7/2006 | Wang et al. | 359/865 |
| 2006/0212202 | A1 * | 9/2006 | Ota | 701/49 |
| 2007/0171057 | A1 | 7/2007 | Ogino et al. | |
| 2008/0158357 | A1 * | 7/2008 | Connell et al. | 348/148 |
| 2010/0080416 | A1 * | 4/2010 | Lee et al. | 382/103 |
| 2010/0110523 | A1 * | 5/2010 | Varaprasad et al. | 359/273 |
| 2010/0177413 | A1 * | 7/2010 | Lee et al. | 359/843 |
| 2011/0137520 | A1 | 6/2011 | Rector et al. | |
| 2012/0094657 | A1 | 4/2012 | Gullapalli et al. | |
| 2012/0166047 | A1 * | 6/2012 | Khanafer et al. | 701/48 |
| 2012/0172012 | A1 | 7/2012 | Sumcad et al. | |

(Continued)

OTHER PUBLICATIONS

International Search Report and Written Opinion received for PCT Patent Application No. PCT/US2013/062010, mailed on Dec. 17, 2013, 11 pages.

(Continued)

*Primary Examiner* — Thomas G Black
*Assistant Examiner* — Tyler Paige
(74) *Attorney, Agent, or Firm* — Barnes & Thornburg LLP

(57) ABSTRACT

Technologies for mirror adjustment include an in-vehicle computing system of a vehicle to determine a position of a feature of a face of a driver of the vehicle in an image captured by a camera of the vehicle. The in-vehicle computing system determines a position of the feature of the face of the driver relative to a mirror of the vehicle based on configuration data of the vehicle and the captured image. The in-vehicle computing system further determines an angle between the feature of the face of the driver, the mirror, and an ideal normal of the mirror. The configuration data identifies a location of the camera relative to the mirror, and the ideal normal is an imaginary line normal to the mirror and extending therefrom when the mirror is positioned in a reference position. The in-vehicle computing system adjusts an orientation of the mirror based on the determined angle.

24 Claims, 7 Drawing Sheets

(56) References Cited

U.S. PATENT DOCUMENTS

| | | |
|---|---|---|
| 2012/0214470 A1 | 8/2012 | Tadayon et al. |
| 2013/0197674 A1 | 8/2013 | Lowry |
| 2014/0088793 A1 | 3/2014 | Morgan et al. |
| 2015/0203039 A1* | 7/2015 | Kaplan et al. ............ 359/847 |

OTHER PUBLICATIONS

"OnStar," Wikipedia, The Free Encyclopedia, retrieved from: <http://en.wikipedia.org/w/index.php?title=OnStar&oldid=461637591>, edited Nov. 20, 2011, 5 pages.

"Automotive electronics," Wikipedia, The Free Encyclopedia, retrieved from: <http://en.wikipedia.org/w/index.php?title=Automotive_electronics&oldid=458283111>, edited Oct. 31, 2011, 4 pages.

"In car entertainment," Wikipedia, The Free Encyclopedia, retrieved from: <http://en.wikipedia.org/w/index.php?title=In_car_entertainment&oldid=457701186>, edited Oct. 27, 2011, 2 pages.

"Automotive navigation system," Wikipedia, The Free Encyclopedia, retrieved from: <http://en.wikipedia.org/w/index.php?title=Automotive_navigation_system&oldid=457353694>, edited Oct. 25, 2011, 9 pages.

* cited by examiner

VEHICLE MIRROR ADJUSTMENT

BACKGROUND

Modern motor vehicles often include a multitude of options and personally configurable features. Depending on the particular vehicle and the options installed, a vehicle may include, for example, an assortment of ergonomic controls (e.g., to adjust the viewing angle of the mirrors, modify the tilt of the steering wheel, etc.), vehicle mechanical performance controls (e.g., to modify the shift patterns of the transmission, transition between two-wheel and four-wheel drive, modify traction control settings, etc.), comfort controls (e.g., to modify climate control settings, reposition the seat, adjust window positioning, etc.), electronic controls (e.g., to modify satellite navigation, in-vehicle infotainment, or other in-vehicle computing system settings), and/or other controls to permit a vehicle occupant to modify various vehicle settings.

In traditional systems, a vehicle occupant must interface with the various controls via a physical input device (e.g., a switch, button, knob, touch screen, or other physical input device) or another direct input mechanism (e.g., speech-based audio input via the vehicle infotainment system). As such, upon entry to a vehicle, the occupant must spend time to modify various controls to the desired settings. For example, the driver of the vehicle must generally reposition the driver's seat and adjust the rear view and side mirrors for safe operation of the vehicle. Such manual adjustment can be cumbersome in circumstances in which multiple drivers operate a particular vehicle (e.g., a work truck) and oftentimes results in drivers foregoing the readjustment of the controls. Some more advanced systems allow users to store personalized vehicle settings on the in-vehicle computing system for future use.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
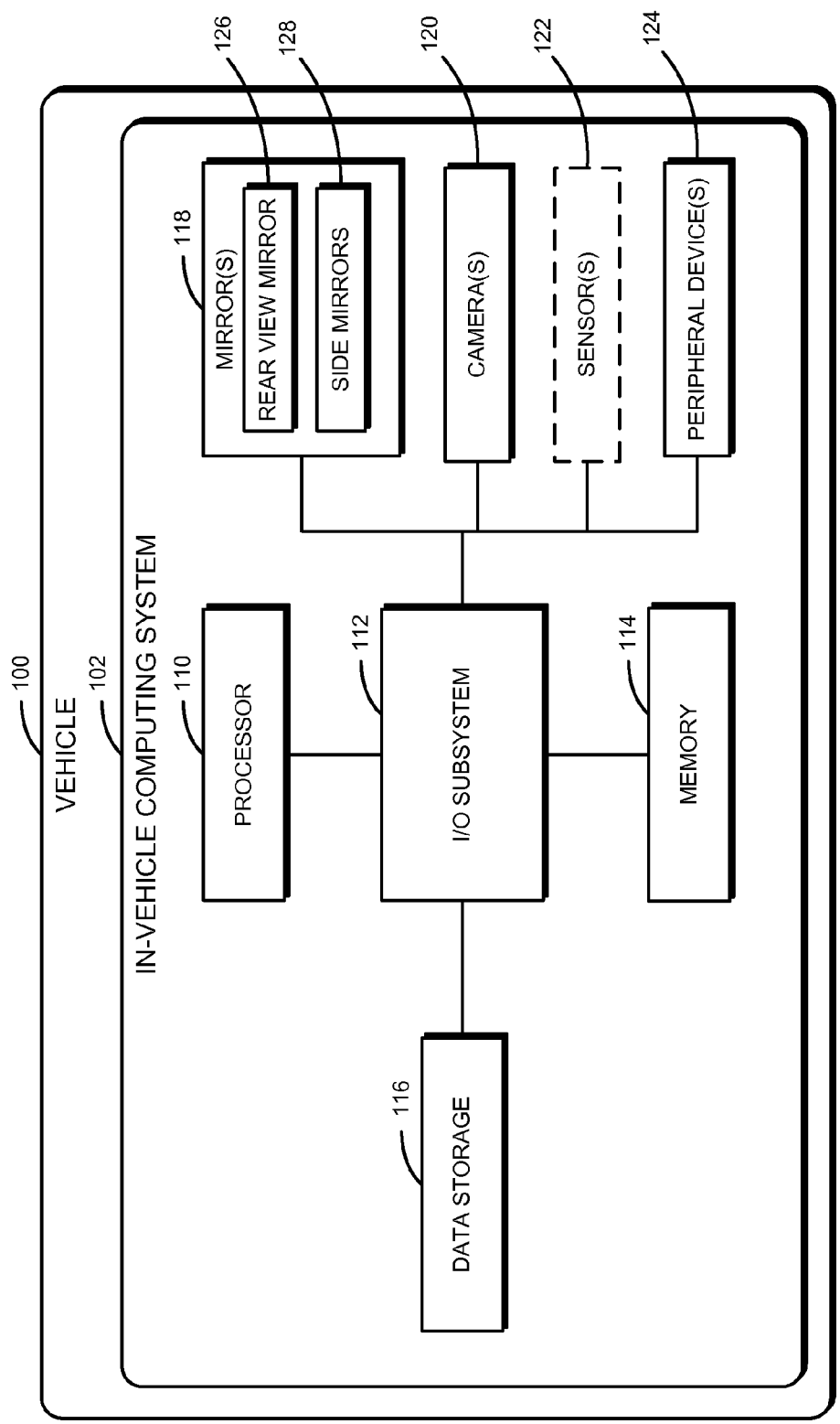
FIG. 1 is a simplified block diagram of at least one embodiment of an in-vehicle computing system for mirror adjustment of a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a vehicle 100 includes an in-vehicle computing system 102, which may be embodied as any type of computing system capable of performing the functions described herein. In the illustrative embodiment, the vehicle 100 is embodied as a wheeled passenger vehicle (e.g., a car, trust, truck-tractor, bus, motorcycle, etc.). However, it should be appreciated that, in other embodiments, the vehicle 100 may be embodied as another type of vehicle (e.g., as a boat, rail-driven trolley, or another vehicle suited for application of the described techniques and mechanisms). As described herein, the in-vehicle computing system 102 is configured to adjust the position of one or more mirrors of the vehicle 100 based on the location/position of the driver's eyes (e.g., automatically and/or without any previous user configurations). In some embodiments, the in-vehicle computing system 102 may be embodied as, or form a portion of, an in-vehicle infotainment system, a navigation system, and/or other vehicle-based computing system. In other embodiments, the in-vehicle computing system 102 may instead be embodied as a standalone computing device or computing system.

Further, in some embodiments, a remote computing device (not shown) may be communicatively coupled with the in-vehicle computing system 102 and configured to perform one or more of the functions described herein (e.g., remotely) and communicate the results to the in-vehicle computing system 102 via a network (not shown), such as a wired or wireless communication network. In such embodiments, the remote computing device may be embodied as any type of computing device capable of communicating with the in-vehicle computing system 102 and performing the functions described herein (e.g., a server, desktop computer, laptop computer, tablet computer, notebook, netbook, Ultrabook™, a cellular phone, smartphone, personal digital assistant, mobile Internet device, Hybrid device, and/or any other computing/communication device).

As shown in FIG. 1, the illustrative in-vehicle computing system 102 includes a processor 110, an input/output ("I/O") subsystem 112, a memory 114, a data storage 116, one or more mirrors 118, one or more cameras 120, and one or more peripheral devices 124. The in-vehicle computing system 102 may also include one or more sensors 122 in some embodiments. Of course, the in-vehicle computing system 102 may include other or additional components, such as those commonly found in a typical computing device (e.g., communication circuitry, various input/output devices, and/or other components), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle computing system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data useful during operation of the in-vehicle computing system 102 as discussed below.

Figure 2:
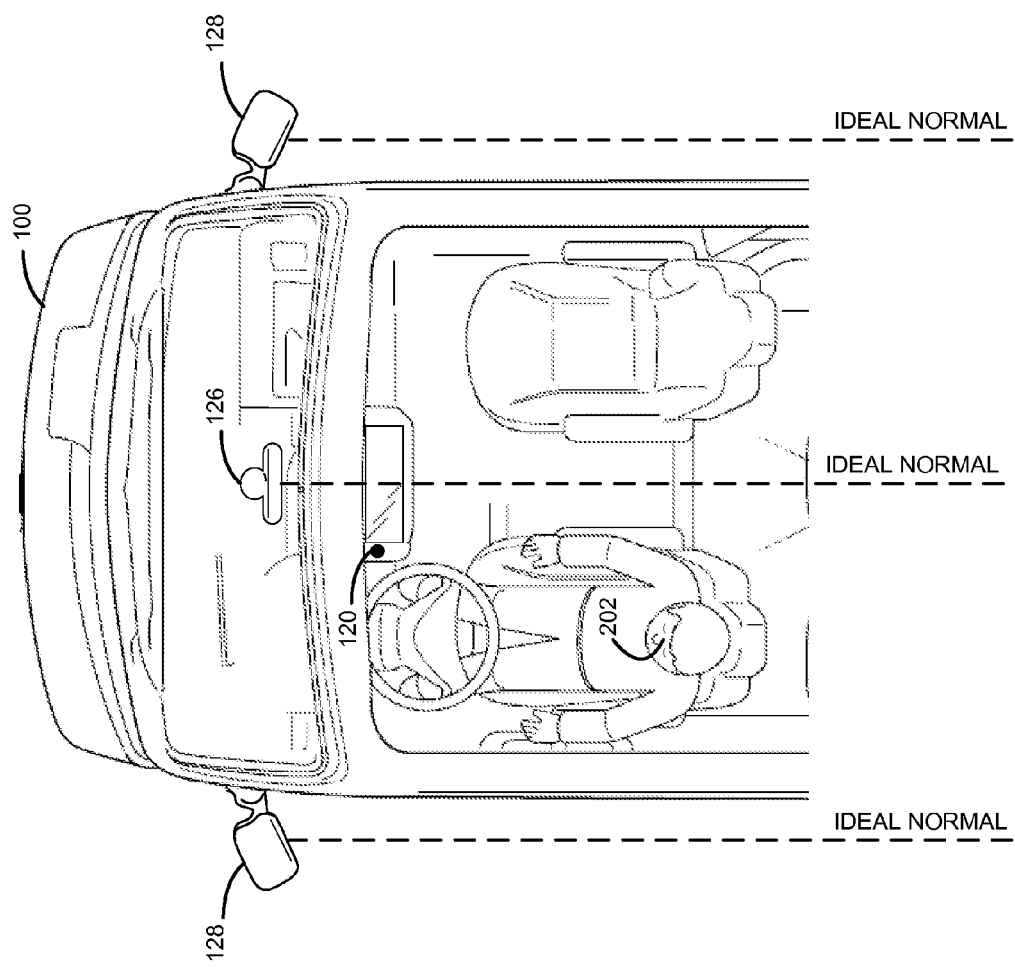
FIG. 2 is a simplified block diagram of at least one embodiment of the vehicle of FIG. 1.

Depending on its type, the vehicle 100 may include one or more mirrors 118, which may be located in various positions about the vehicle 100. For example, in the illustrative embodiment, the vehicle 100 includes a rearview mirror 126 and two side mirrors 128 as shown in FIG. 2. In particular, the vehicle 100 has a rearview mirror 126 attached to the front windshield in the interior of the vehicle 100 and a driver's side mirror 128 and passenger's side mirror 128 attached to the exterior of the vehicle 100, which is typical for most passenger vehicles. In the illustrative embodiment, the rotation (e.g., left-right) and/or tilt (e.g., up/down) of the mirrors 118 are able to be electromechanically adjusted. For example, each mirror 118 may include a movement device 320 (see FIG. 3) such as a motor, servo, actuator, or other mechanism configured to adjust the corresponding mirror 118 based on electronic signals (e.g., received from the processor 110). In some embodiments, the techniques described herein may be applied individually to each of the mirrors 118. In other embodiments, the techniques described herein may be applied to a single mirror 118 and the calculations and/or adjustment angle determined for that particular mirror 118 may be utilized to determine the appropriate adjustment angles for the other mirrors 118 (e.g., based on the configuration data for the vehicle 100 and/or other data).

The camera(s) 120 may be embodied as any peripheral or integrated device suitable for capturing images, such as a still camera, a video camera, or other device capable of capturing video and/or images. The in-vehicle computing system 102 may include multiple cameras 120 in some embodiments, which may be used to capture images, for example, from different perspectives. Alternatively or additionally, one or more of the cameras 120 may be a three-dimensional (3D) camera, depth camera, bifocal camera, and/or be otherwise capable of generating a depth image, channel, or stream. For example, one or more of the cameras 120 may include an infrared (IR) projector and an IR sensor such that the IR sensor estimates depth values of objects in the scene by analyzing the IR light pattern projected on the scene by the IR projector. In another embodiment, one or more of the cameras 120 includes at least two lenses and corresponding sensors configured to capture images from at least two different viewpoints of a scene (e.g., a stereo camera). As discussed below, images captured by the cameras 120 may be utilized to determine the location of the driver's eyes, a midpoint 202 between the driver's eyes (see FIG. 2), and/or the distance of objects (e.g., the driver's eyes) relative to the cameras 120. Accordingly, it should be appreciated that the camera(s) 120 may be positioned such that the driver's face will be within the field of view of the camera(s) 120 while the driver is seated (e.g., positioned on the dashboard, front console, steering wheel, rearview mirror housing, front windshield, or other suitable location(s)).

As shown in FIG. 1, the in-vehicle computing system 102 may include one or more sensors 122, which may be used to collect data regarding a driver of the vehicle 100, the environment of the vehicle 100, the vehicle 100 itself, and/or other data to be used in determining the location of the driver's eyes relative to the mirrors 118. In various embodiments, the sensors 122 may be embodied as, or otherwise include, for example, eye tracking sensors, location sensors, proximity sensors, optical sensors, light sensors, audio sensors, temperature sensors, motion sensors, piezoelectric sensors, and/or other types of sensors. Of course, the in-vehicle computing system 102 may also include components and/or devices configured to facilitate the use of the sensor(s) 122. In some embodiments, data collected by the sensors 122 may be stored as configuration data.

The peripheral devices 124 may include any number of additional peripheral or interface devices, such as speakers, microphones, additional storage devices, and so forth. The particular devices included in the peripheral devices 124 may depend on, for example, the type and/or intended use of the in-vehicle computing system 102 (e.g., whether the in-vehicle computing system 102 is a stand-alone system or incorporated into a larger in-vehicle infotainment system).

Figure 3:
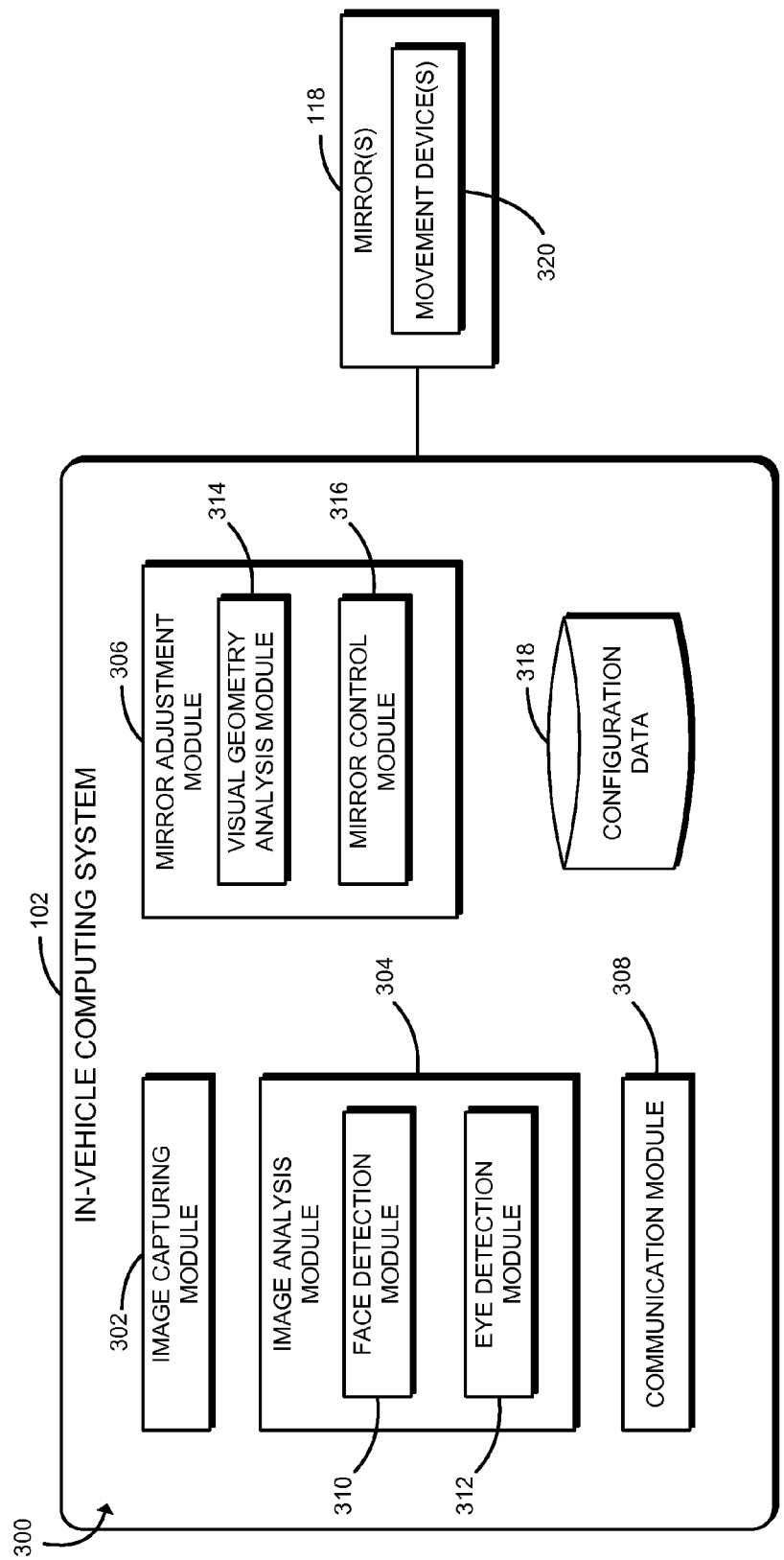
FIG. 3 is a simplified block diagram of at least one embodiment of an environment of the in-vehicle computing system of FIG. 1.

Referring now to FIG. 3, in use, the illustrative in-vehicle computing system 102 establishes an environment 300 for mirror adjustment. As discussed below, the in-vehicle computing system 102 determines a position of the driver's eyes relative to a mirror 118 and adjusts the angle of the mirror 118 so that the driver has an improved field of view (e.g., so the mirror 118 is adjusted to an ideal or optimal position). The illustrative environment 300 of the in-vehicle computing system 102 includes an image capturing module 302, an image analysis module 304, a mirror adjustment module 306, and a communication module 308. Additionally, the image analysis module 304 includes a face detection module 310 and an eye detection module 312, and the mirror adjustment module 306 includes a visual geometry analysis module 314 and a mirror control module 316. Each of the modules of the environment 300 may be embodied as hardware, software, firmware, or a combination thereof. Additionally, in some embodiments, one or more of the illustrative modules may form a portion of another module (e.g., the image analysis module 304 may form a portion of the mirror adjustment module 306).

The image capturing module 302 controls the camera(s) 120 to capture images within the field of view of the camera(s) 120. For example, as discussed below, the image capturing module 302 may capture images of the driver's face (i.e., via the cameras 120), which may be used to determine the location of one or more of the driver's facial features (e.g., the driver's eyes, nose, mouth, and/or ears) relative to various components of the vehicle 100 (e.g., the camera 120 and the mirrors 118) based on the known geometry of the vehicle 100 stored as configuration data 318.

The image analysis module 304 receives the images captured by the camera 120 from the image capturing module 302 (e.g., captured as streamed video or individual images/frames). As discussed in more detail below, the image analysis module 304 analyzes the captured images to determine the location of the driver's eyes and/or other reference points (e.g., facial features such as the driver's nose, mouth, ears, and/or other features) in the captured image. It should be appreciated that the image analysis module 304 may utilize any suitable object detection/tracking algorithm for doing so (e.g., edge detection, image segmentation, and/or other suitable techniques). Additionally, in some embodiments, the image analysis module 304 determines a reference point in the captured image based on the determined location of the driver's eyes and/or other facial features in the captured image (e.g., the midpoint 202 between the driver's eyes as shown in FIG. 2). As discussed above, the image analysis module 304 includes the face detection module 310 and the eye detection module 312.

The face detection module 310 detects the existence of one or more person's faces in a captured image and determines the location of any detected faces in the captured image (e.g., the driver's face). The face detection module 310 may use any suitable face detection algorithm or methodology to perform such detection. Similarly, the eye detection module 312 detects the location of a person's eyes in the captured image and may use any suitable eye detection algorithm or methodology to do so. It should be appreciated that, in some embodiments, the eye detection module 312 utilizes the location of the person's face (i.e., determined with the face detection module 310) to determine the location of the person's eyes. That is, the image region requiring analysis to determine the location of the person's eyes may be narrowed to within the boundaries of the person's face. Of course, in other embodiments, the eye detection module 312 may determine the location of the person's eyes independent of or without a determination of the location of the person's face.

The mirror adjustment module 306 determines the appropriate orientations (i.e., adjustment angles) of the mirrors 118 and handles the adjustment of the mirrors 118 based on the determined orientations. It should be appreciated that the mirror adjustment module 306 may use any suitable techniques or mechanisms for doing so. As indicated above, the mirror adjustment module 306 includes the visual geometry analysis module 314 and the mirror control module 316.

The visual geometry analysis module 314 determines a position of the eyes of the driver or other reference point (e.g., the midpoint 202 or other facial feature of the driver) relative to the mirror(s) 118 of the vehicle 100. In the illustrative embodiment, the visual geometry analysis module 314 makes such a determination based on the location of the driver's eyes in the captured image (i.e., as determined by the image analysis module 304) and configuration data 318. For example, the visual geometry analysis module 314 may determine an angle between the driver's eyes, the mirror 118, and an "ideal normal" of the mirror 118 (see, for example, $\theta_0$ of FIG. 6).

The configuration data 318 may, for example, identify the geometrical and/or spatial relationships between various components of the vehicle 100. That is, the configuration data 318 may establish a coordinate system and identify the locations of the various components of the vehicle 100 on that coordinate system. For example, the configuration data 318 may identify the location of the camera 120 relative to each of the mirrors 118 (e.g., distance and angle), the location of the camera 120 relative to the headrest of the driver's seat, the location of the mirrors 118 relative to one another, and/or other relevant geometrical or spatial relationships. Additionally, in some embodiments, the configuration data 318 may identify an "ideal normal" for each of the mirrors 118. The ideal normal of a particular mirror 118 is a hypothetical line/ray from the mirror 118 (e.g., a center of the mirror) to the rear of the vehicle 100. For example, in the illustrative embodiment of FIG. 2, the ideal normal of the rearview mirror 126 extends from the rearview mirror 126 to the rear of the vehicle 100 along a line parallel to the longitudinal axis of the vehicle 100. The side mirrors 128 of FIG. 2 similarly extend from those mirrors 128 along lines parallel to the longitudinal axis of the vehicle 100. In some embodiments, the ideal normal is the perspective from the point of view of the particular mirror 118 that provides the driver of the vehicle 100 with the best field of view. The ideal normal may be otherwise determined (e.g., based on user input or other stored configuration data 318) for one or more of the mirrors 118. For example, a particular user or vehicle 100 manufacturer may determine that it is more prudent to have the side mirrors 128 "capture" images at some other angle (i.e., have the mirrors "point outward"). It should further be appreciated that the configuration data 318 for different types of vehicles 100 may vary due to, for example, the inherent structural differences between those vehicles 100.

Referring back to FIG. 3, the mirror control module 316 is configured to adjust the angle of the mirror(s) 118 based on the determinations of the visual geometry analysis module 314. As indicated above, the mirror control module 316 may adjust the mirrors 118 using any suitable techniques and/or mechanisms (e.g., by transmitting electromechanical control signals to the mirrors 118). For example, in the illustrative embodiment, the mirror adjustment module 306 controls the movement device(s) 320 of the mirrors 118 to adjust, or otherwise move, the mirrors as desired. Although primarily described herein with regard to rotating a mirror 118 to adjust the angle of a mirror 118 relative to the ideal normal of the mirror 118 along a horizontal plane, the algorithms, techniques, and/or mechanisms described herein may also be utilized to tilt the mirrors 118 to adjust the angle of the mirrors 118 along a vertical plane. That is, in some embodiments, the rotation of the mirror 118 along the horizontal plane and the tilt of the mirror 118 along the vertical plane may involve similar calculations and adjustments.

The communication module 308 handles the communication between the in-vehicle computing system 102 and remote devices (e.g., through a network). For example, in some embodiments, the communication module 308 may transmit the configuration data 318, captured images, and/or other data to a remote device (e.g., a mobile computing device, server, or other suitable device) to perform one or more of the analytical functions described herein.

Figure 4:
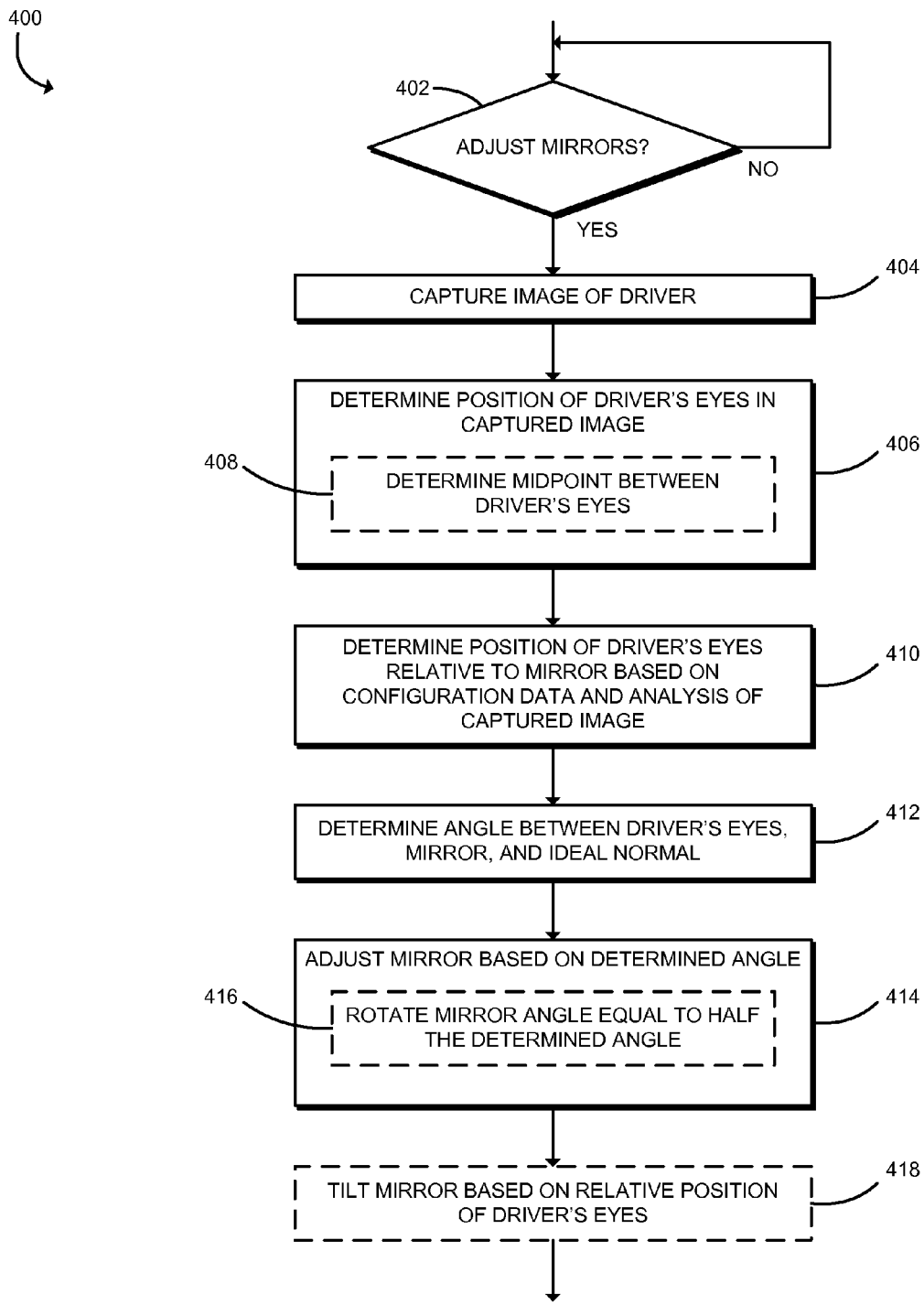
FIG. 4 is a simplified flow diagram of at least one embodiment of a method for vehicle mirror adjustment that may be executed by the in-vehicle computing system of FIG. 1.

Referring now to FIG. 4, in use, the in-vehicle computing system 102 may execute a method 400 for adjusting one or more of the mirrors 118 of the vehicle 100. The illustrative method 400 begins with block 402 in which the in-vehicle computing system 102 determines whether to adjust the mirrors 118 of the vehicle 100. It should be appreciated that, in some embodiments, the method 400 may be executed separately for the individual adjustment of each mirror 118. In other embodiments, the method 400 may be executed for the adjustment of a single mirror 118 and those calculations may be utilized to determine the appropriate adjustment angles of the other mirrors 118 (e.g., based on the configuration data 318). It should further be appreciated that, depending on the embodiment, the in-vehicle computing system 102 may determine to adjust the mirrors 118 based on various conditions.

In one embodiment, the vehicle 100 may include a physical or virtual user interface that permits the driver of the vehicle 100 to indicate when she is comfortable, situated, seated upright, and/or otherwise ready for the mirrors 118 to be adjusted. For example, it may take some time for the driver to reposition the seat, secure any belongings, buckle a child in the passenger's seat, and/or perform other actions prior to driving. Accordingly, in such an embodiment, the driver may, for example, push a button or provide audio input once situated. In other embodiments, the in-vehicle computing system 102 may determine to adjust the mirrors 118 once the driver is seated and the driver's eyes are within the field of view of the camera(s) 120. In yet another embodiment, the in-vehicle computing system 102 may continuously or periodically adjust the mirrors 118 based on the currently determined position of the driver's eyes. Such embodiments provide the driver with a clear view through the mirrors 118 even if the driver repositions herself after the mirrors 118 are initially adjusted.

If the in-vehicle computing system 102 determines to adjust the mirrors 118, the in-vehicle computing system 102 captures an image of the driver in block 404. As discussed above, in some embodiments, the in-vehicle computing system 102 utilizes a single camera 120 to capture images of the driver, whereas in other embodiments, the in-vehicle computing system 102 utilizes a plurality of cameras 120 to, for example, capture images of the driver from different perspectives.

In block 406, the in-vehicle computing system 102 determines the position of the driver's eyes in the captured image. As indicated above, the in-vehicle computing system 102 may utilize any suitable algorithms, techniques, and/or mechanisms for doing so (e.g., edge detection, image segmentation, gaze tracking, etc.). Further, in block 408, the in-vehicle computing system 102 may determine the midpoint 202 between the driver's eyes in the captured image based on the determined positions of the driver's eyes. As described below, the midpoint 202 is used as a reference point representative of the location of the driver's eyes for various calculations in the illustrative embodiment (see, for example, FIGS. 6 and 7). Of course, in other embodiments, another reference point may be utilized (e.g., the locations of the driver's eyes themselves).

In block 410, the in-vehicle computing system 102 determines the position of the driver's eyes (e.g., the midpoint 202) relative to the mirror 118 based on the configuration data 318 and the analysis of the captured image (i.e., the determined position of the driver's eyes and/or midpoint 202 in the captured image). As discussed above, the configuration data 318 includes the geometrical and/or spatial relationships between various components of the vehicle 100. In the illustrative embodiment, as part of the determination of the position of the driver's eyes relative to the mirror 118, the in-vehicle computing system 102 determines the distance between the camera 120 and the driver's eyes (e.g., the midpoint 202) using a suitable technique or algorithm. For example, as discussed above, the configuration data 318 may identify the distance between the camera 120 and the driver's seat headrest. Based on that information and the determined position of the driver's eyes in the captured image, the in-vehicle computing system 102 may determine or estimate the distance between the camera 120 and the driver's eyes (e.g., based on a determined or estimated dimensions of the driver's head). In another embodiment, the in-vehicle computing system 102 may utilize multiple cameras 120 or a 3D/depth camera 120 to determine the distance between the camera(s) 120 and the driver's eyes. Based on the distance between the camera(s) 120 and the driver's eyes and the known distances between the components of the vehicle 100 from the configuration data 318, the in-vehicle computing system 102 may determine the position of the driver's eyes (e.g., the midpoint 202) relative to the mirrors 118 and other components of the vehicle 100.

Figure 6:
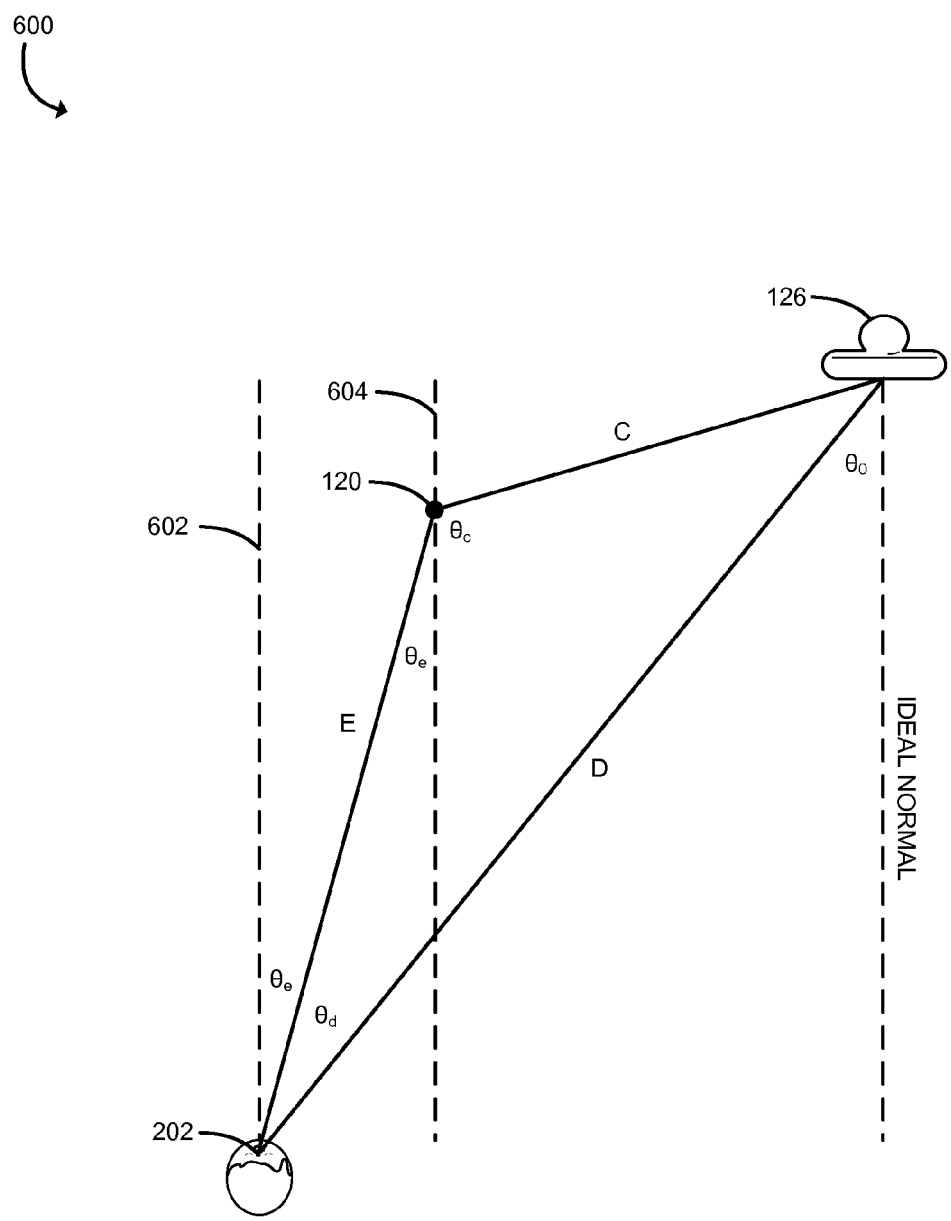
FIGS. 6 and 7 are simplified spatial diagrams of a driver and components of the vehicle of FIG. 1.

In block 412, the in-vehicle computing system 102 determines the angle between the driver's eyes, the mirror 118, and the ideal normal of the mirror 118 (see, for example, the angle, $\theta_0$, of FIG. 6). The in-vehicle computing system 102 may make such a determination based on the configuration data 318, the determined position of the driver's eyes relative to the other components of the vehicle 100, and/or other determined spatial relationships between the driver's eyes, the mirror 118, the camera 120, and/or other reference points or components of the vehicle 100. Additionally, the in-vehicle computing system 102 may utilize any suitable techniques or algorithms in doing so.

Figure 5:
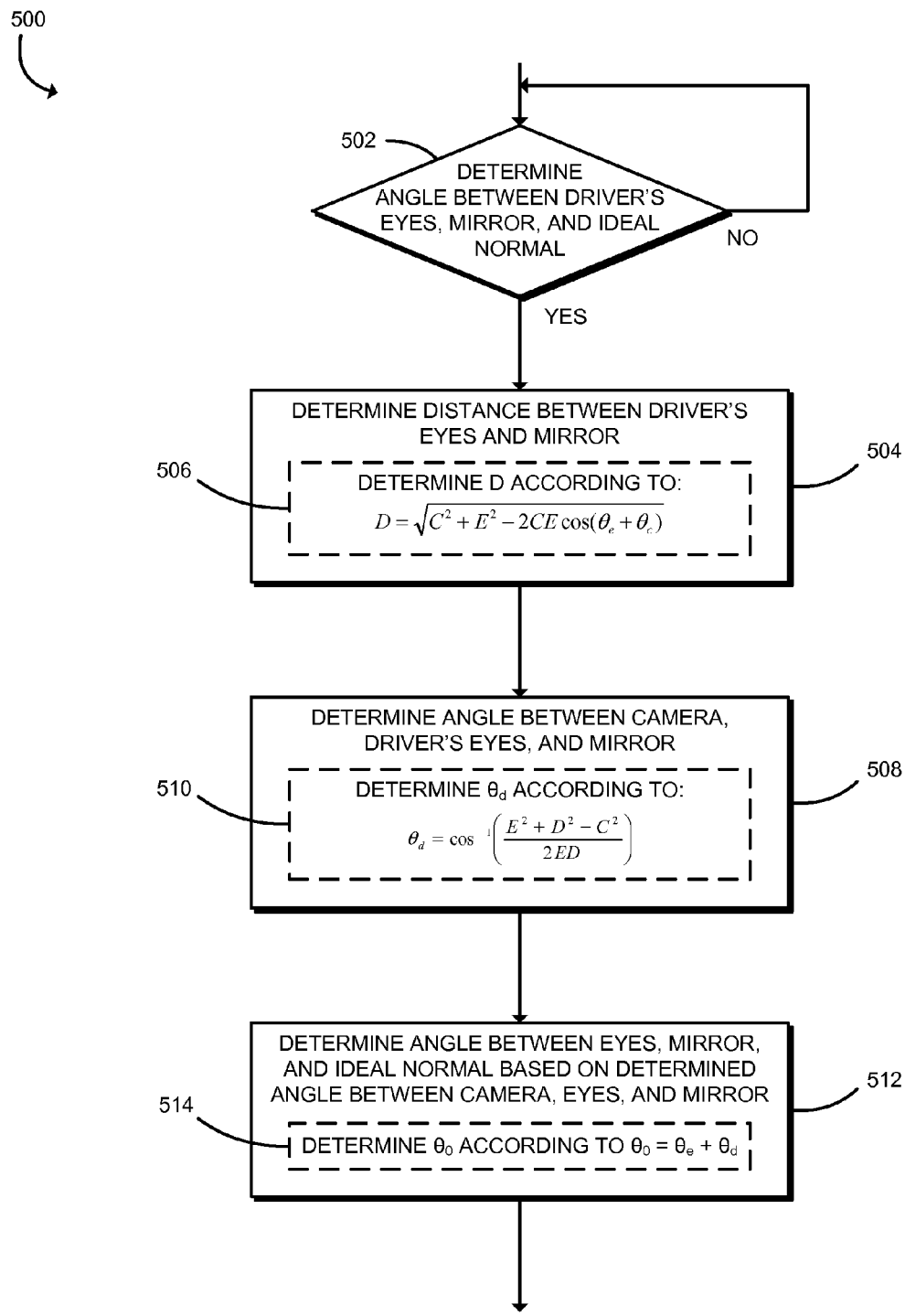
FIG. 5 is a simplified flow diagram of at least one embodiment of a method for determining an angle between a driver's eyes, a mirror, and an ideal normal of the mirror the may be executed by the in-vehicle computing system of FIG. 1.

To determine the angle between the driver's eyes, the rearview mirror 126, and the ideal normal of the rearview mirror 126, the in-vehicle computing system 102 may execute a method 500 as shown in FIG. 5. The equations calculations described below assume the camera 120 is positioned between the driver's eyes and the rearview mirror 126 (see FIG. 6). However, it should be appreciated that similar determinations and/or calculations may be made with respect to the side mirrors 128 and/or other mirrors 118 of the vehicle 100 if those mirrors 118 are positioned in other configurations based on, for example, the law of cosines and/or other trigonometric and geometric properties. Based on the configuration data 318 and/or the determinations described above, various known spatial relationships (e.g., the distance between the camera 120 and the mirror 126, the distance between the camera 120 and the driver's eyes, the angles $\theta_e$ and $\theta_c$ as shown in FIG. 6, and other spatial relationships) may be utilized to determine the angle between the driver's eyes, the mirror 118, and the ideal normal of the mirror 118 or otherwise perform calculations for determining the necessary angle of adjustment of the mirror 118.

The illustrative method 500 begins with block 502 in which the in-vehicle computing system 102 determines whether to determine the angle between the driver's eyes, the mirror 126, and the ideal normal of the mirror 126. If so, the in-vehicle computing system 102 determines the distance between the driver's eyes (e.g., the midpoint 202) and the mirror 126 in block 504. In doing so, in block 504, the in-vehicle computing system 102 may determine, in some embodiments, the distance between the driver's eyes (e.g., the midpoint 202) and the mirror 126 according to $D=\sqrt{C^2+E^2-2CE\cos(\theta_e+\theta_c)}$, where D is the distance between the driver's eyes (e.g., the midpoint 202) and the mirror 126; C is the distance between the camera 120 and the mirror 126; E is the distance between the driver's eyes (e.g., the midpoint 202) and the camera 120; $\theta_e$ is the angle between a hypothetical normal 602 extending from the driver's eyes (e.g., the midpoint 202) toward a direction of the camera 120, the driver's eyes (e.g., the midpoint 202), and the camera 120; and $\theta_c$ is the angle between a hypothetical normal 604 extending from the camera 120 toward a direction of the driver's eyes, the camera 120, and the mirror 126 (see FIG. 6).

In block 508, the in-vehicle computing system 102 determines the angle between the camera 120, the driver's eyes (e.g., the midpoint 202), and the mirror 126. In doing so, in block 510, the in-vehicle computing system 102 may determine the angle between the camera 120, the driver's eyes, and the mirror 126 according to $$\theta_d = \cos^{-1}\left(\frac{E^2+D^2-C^2}{2ED}\right),$$

where $\theta_d$ is the angle between the camera 120, the driver's eyes (e.g., the midpoint 202), and the mirror 126; D is the distance between the driver's eyes (e.g., the midpoint 202) and the mirror 126 as determined above; C is the distance between the camera 120 and the mirror 126; E is the distance between the driver's eyes (e.g., the midpoint 202) and the camera 120; and $\cos^{-1}(\ )$ is the inverse cosine function (see FIG. 6).

In block 512, the in-vehicle computing system 102 determines the angle between the driver's eyes (e.g., the midpoint 202), the mirror 126, and the ideal normal of the mirror 126 based on the determined angle between the camera 120, the driver's eyes, and the mirror 126. In doing so, in block 514, the in-vehicle computing system 102 may determine the angle, $\theta_0$, according to $\theta_0=\theta_e+\theta_d$, where $\theta_0$ is the angle between the driver's eyes (e.g., the midpoint 202), the mirror 126, and the ideal normal of the mirror 126; $\theta_e$ is the angle between the hypothetical normal 602, the driver's eyes (e.g., the midpoint 202) and the camera 120; and $\theta_d$ is the angle between the camera 120, the driver's eyes (e.g., the midpoint 202), and the mirror 126 (see FIG. 6).

Figure 7:
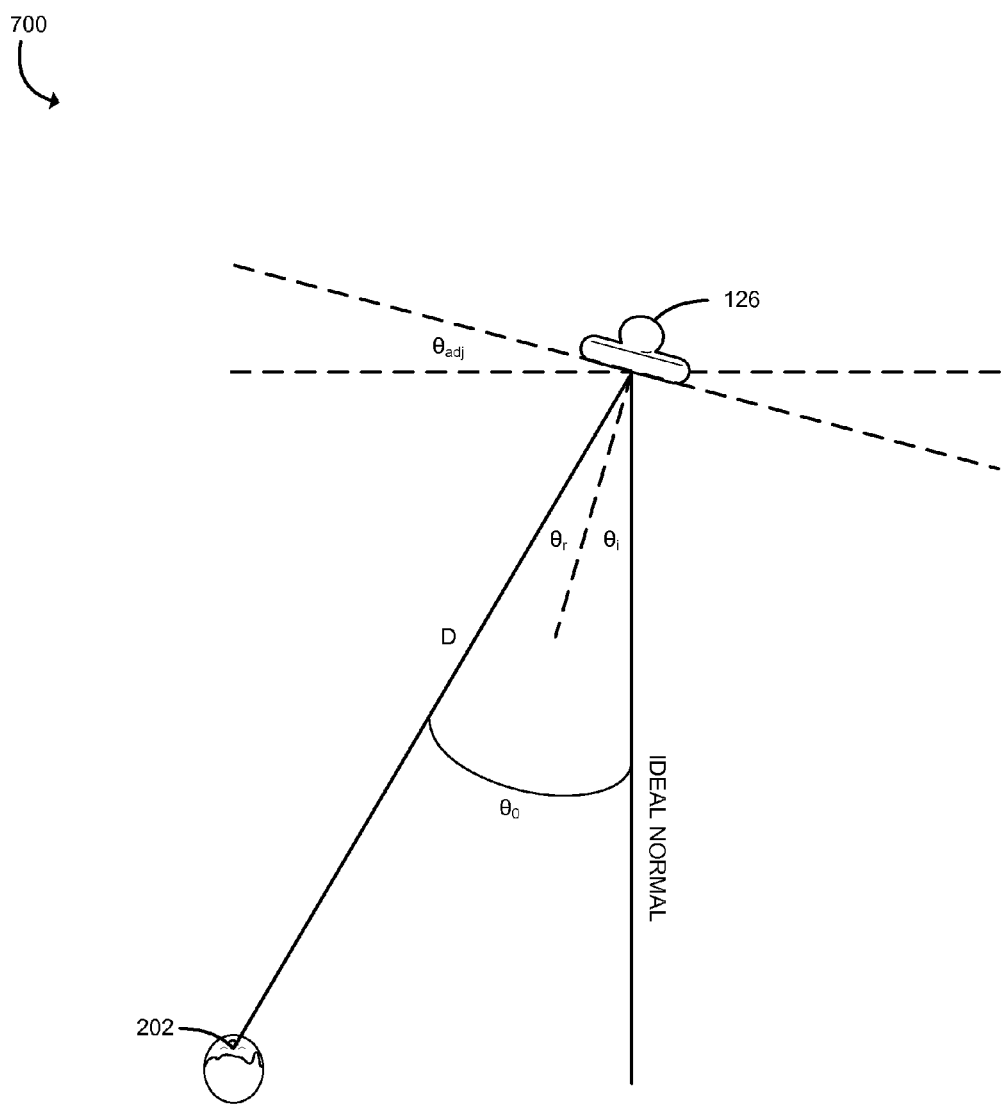

Referring back to FIG. 4, the in-vehicle computing system 102 adjusts the mirror 118 based on the determined angle, $\theta_0$, in block 414. For example, in some embodiments, the in-vehicle computing system 102 rotates the mirror an angle equal to half the determined angle, $\theta_0$, determined in block 414. That is, in some embodiments, the in-vehicle computing system 102 pivots the mirror 118 (e.g., along a horizontal plane) by a certain angle of adjustment, $\theta_{adj}$, based on the determined angle, $\theta_0$, such that the images "captured" in the mirror 118 are images from the direction of the ideal normal of the mirror 118 as shown in FIG. 7.

In block 418, the in-vehicle computing system 102 may, alternatively or additionally, tilt the mirror (e.g., along a vertical plane) based on the relative position of the driver's eyes. As indicated above, in some embodiments, the in-vehicle computing system 102 may determine the appropriate angle of tilt based on the techniques, algorithms, and/or mechanisms described herein. Of course, in other embodiments, the in-vehicle computing system 102 may otherwise determine the tilt angle.

EXAMPLES

Illustrative examples of the technologies disclosed herein are provided below. An embodiment of the technologies may include any one or more, and any combination of, the examples described below.

Example 1 includes an in-vehicle computing system of a vehicle for mirror adjustment, the in-vehicle computing system comprising an image analysis module to determine a position of a feature of a face of a driver of the vehicle in an image captured by a camera of the vehicle; and a mirror adjustment module to (i) determine a position of the feature of the face of the driver relative to a mirror of the vehicle based on the captured image and configuration data that identifies a location of the camera relative to the mirror, (ii) determine an angle between the feature of the face of the driver, the mirror, and an ideal normal of the mirror, and (iii) adjust an orientation of the mirror based on the determined angle; wherein the ideal normal of the mirror is an imaginary line normal to the mirror and extending therefrom when the mirror is positioned in a reference position.

Example 2 includes the subject matter of Example 1, and wherein to determine the position of the feature of the face of the driver comprises to determine a position of eyes of the driver.

Example 3 includes the subject matter of any of Examples 1 and 2, and wherein to determine the position of the eyes of the driver comprises to determine a midpoint between the eyes of the driver in the captured image.

Example 4 includes the subject matter of any of Examples 1-3, and wherein to determine the position of the eyes of the driver relative to the mirror comprises to determine a distance between the camera and the eyes of the driver.

Example 5 includes the subject matter of any of Examples 1-4, and wherein to determine the angle between the eyes of the driver, the mirror, and the ideal normal of the mirror comprises to determine a distance between the eyes of the driver and the mirror; determine an angle between the camera, the eyes of the driver, and the mirror based on the determined distance between the eyes of the driver and the mirror; and determine an angle between the eyes of the driver, the mirror, and the ideal normal based on the determined angle between the camera, the eyes of the driver, and the mirror.

Example 6 includes the subject matter of any of Examples 1-5, and wherein to determine the distance between the eyes of the driver and the mirror comprises to determine a distance, D, according to $D=\sqrt{C^2+E^2-2CE\cos(\theta_e+\theta_c)}$, wherein D is the distance between the eyes of the driver and the mirror; C is a distance between the camera and the mirror; E is a distance between the eyes of the driver and the camera; $\theta_e$ is an angle between a hypothetical normal extending from the eyes of the driver toward a direction of the camera, the eyes of the driver, and the camera; and $\theta_e$ is an angle between a hypothetical normal extending from the camera toward a direction of the eyes of the driver, the camera, and the mirror.

Example 7 includes the subject matter of any of Examples 1-6, and wherein to determine the angle between the camera, the eyes of the driver, and the mirror comprises to determine an angle, $\theta_d$, according to $$\theta_d = \cos^{-1}\left(\frac{E^2 + D^2 - C^2}{2ED}\right),$$

wherein $\theta_d$ is the angle between the camera, the eyes of the driver, and the mirror; D is a distance between the eyes of the driver and the mirror; C is a distance between the camera and the mirror; E is a distance between the eyes of the driver and the camera; and $\cos^{-1}(\ )$ is an inverse cosine function.

Example 8 includes the subject matter of any of Examples 1-7, and wherein to determine the angle between the eyes of the driver, the mirror, and the ideal normal comprises to determine an angle, $\theta_0$, according to $\theta_0 = \theta_e + \theta_d$, wherein $\theta_0$ is the angle between the eyes of the driver, the mirror, and the ideal normal; $\theta_e$ is an angle between a hypothetical normal extending from the eyes of the driver toward a direction of the camera, the eyes of the driver, and the camera; and $\theta_d$ is an angle between the camera, the eyes of the driver, and the mirror.

Example 9 includes the subject matter of any of Examples 1-8, and wherein the configuration data further identifies a position of the driver's seat of the vehicle relative to at least one of the camera or the mirror.

Example 10 includes the subject matter of any of Examples 1-9, and wherein to adjust the orientation of the mirror comprises to adjust an angle of the mirror relative to a current position of the mirror.

Example 11 includes the subject matter of any of Examples 1-10, and wherein to adjust the orientation of the mirror comprises to rotate the mirror an angle equal to half the determined angle.

Example 12 includes the subject matter of any of Examples 1-11, and wherein to adjust the orientation of the mirror comprises to rotate the mirror along a horizontal plane defined by the mirror.

Example 13 includes the subject matter of any of Examples 1-12, and wherein the mirror adjustment module is further to tilt the mirror along a plane perpendicular to the horizontal plane.

Example 14 includes the subject matter of any of Examples 1-13, and wherein the imaginary line is parallel to a longitudinal axis of the vehicle.

Example 15 includes the subject matter of any of Examples 1-14, and further including an image capturing module to capture, by the camera of the vehicle, the image of the driver.

Example 16 includes a method for mirror adjustment by an in-vehicle computing system of a vehicle, the method comprising determining, by the in-vehicle computing system, a position of a feature of a face of a driver of the vehicle in an image captured by a camera of the vehicle; determining, by the in-vehicle computing system, a position of the feature of the face of the driver relative to a mirror of the vehicle based on configuration data of the vehicle and the captured image, wherein the configuration data identifies a location of the camera relative to the mirror; determining, by the in-vehicle computing system, an angle between the feature of the face of the driver, the mirror, and an ideal normal of the mirror, wherein the ideal normal is an imaginary line normal to the mirror and extending therefrom when the mirror is positioned in a reference position; and adjusting, by the in-vehicle computing system, an orientation of the mirror based on the determined angle.

Example 17 includes the subject matter of Example 16, and wherein determining the position of the feature of the face of the driver comprises determining a position of eyes of the driver.

Example 18 includes the subject matter of any of Examples 16 and 17, and wherein determining the position of the eyes of the driver comprises determining a midpoint between the eyes of the driver in the captured image.

Example 19 includes the subject matter of any of Examples 16-18, and wherein determining the position of the eyes of the driver relative to the mirror comprises determining a distance between the camera and the eyes of the driver.

Example 20 includes the subject matter of any of Examples 16-19, and wherein determining the angle between the eyes of the driver, the mirror, and the ideal normal of the mirror comprises determining a distance between the eyes of the driver and the mirror; determining an angle between the camera, the eyes of the driver, and the mirror based on the determined distance between the eyes of the driver and the mirror; and determining an angle between the eyes of the driver, the mirror, and the ideal normal based on the determined angle between the camera, the eyes of the driver, and the mirror.

Example 21 includes the subject matter of any of Examples 16-20, and wherein determining the distance between the eyes of the driver and the mirror comprises determining a distance, D, according to $D = \sqrt{C^2 + E^2 - 2CE\cos(\theta_e + \theta_c)}$, wherein D is the distance between the eyes of the driver and the mirror; C is a distance between the camera and the mirror; E is a distance between the eyes of the driver and the camera; $\theta_e$ is an angle between a hypothetical normal extending from the eyes of the driver toward a direction of the camera, the eyes of the driver, and the camera; and $\theta_c$ is an angle between a hypothetical normal extending from the camera toward a direction of the eyes of the driver, the camera, and the mirror.

Example 22 includes the subject matter of any of Examples 16-21, and wherein determining the angle between the camera, the eyes of the driver, and the mirror comprises determining an angle, $\theta_d$, according to $$\theta_d = \cos^{-1}\left(\frac{E^2 + D^2 - C^2}{2ED}\right),$$

wherein $\theta_d$ is the angle between the camera, the eyes of the driver, and the mirror; D is a distance between the eyes of the driver and the mirror; C is a distance between the camera and the mirror; E is a distance between the eyes of the driver and the camera; and $\cos^{-1}(\ )$ is an inverse cosine function.

Example 23 includes the subject matter of any of Examples 16-22, and wherein determining the angle between the eyes of the driver, the mirror, and the ideal normal comprises determining an angle, $\theta_0$, according to $\theta_0 = \theta_e + \theta_d$, wherein $\theta_0$ is the angle between the eyes of the driver, the mirror, and the ideal normal; $\theta_e$ is an angle between a hypothetical normal extending from the eyes of the driver toward a direction of the camera, the eyes of the driver, and the camera; and $\theta_d$ is an angle between the camera, the eyes of the driver, and the mirror.

Example 24 includes the subject matter of any of Examples 16-23, and wherein the configuration data further identifies a position of the driver's seat of the vehicle relative to at least one of the camera or the mirror.

Example 25 includes the subject matter of any of Examples 16-24, and wherein adjusting the orientation of the mirror comprises adjusting an angle of the mirror relative to a current position of the mirror.

Example 26 includes the subject matter of any of Examples 16-25, and wherein adjusting the orientation of the mirror comprises rotating the mirror an angle equal to half the determined angle.

Example 27 includes the subject matter of any of Examples 16-26, and wherein adjusting the orientation of the mirror comprises rotating the mirror along a horizontal plane defined by the mirror.

Example 28 includes the subject matter of any of Examples 16-27, and further including tilting the mirror along a plane perpendicular to the horizontal plane.

Example 29 includes the subject matter of any of Examples 16-28, and wherein the imaginary line is parallel to a longitudinal axis of the vehicle.

Example 30 includes the subject matter of any of Examples 16-29, and further including capturing, by the camera of the vehicle, the image of the driver.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to being executed, result in a computing device performing the method of any of Examples 16-30.

Example 33 includes a computing device for mirror adjustment, the computing device comprising means for performing the method of any of Examples 16-30.

Example 34 includes an apparatus for mirror adjustment by an in-vehicle computing system of a vehicle, comprising means for determining, by the in-vehicle computing system, a position of a feature of a face of a driver of the vehicle in an image captured by a camera of the vehicle; means for determining, by the in-vehicle computing system, a position of the feature of the face of the driver relative to a mirror of the vehicle based on configuration data of the vehicle and the captured image, wherein the configuration data identifies a location of the camera relative to the mirror; means for determining, by the in-vehicle computing system, an angle between the feature of the face of the driver, the mirror, and an ideal normal of the mirror, wherein the ideal normal is an imaginary line normal to the mirror and extending therefrom when the mirror is positioned in a reference position; and means for adjusting, by the in-vehicle computing system, an orientation of the mirror based on the determined angle.

Example 35 includes the subject matter of Example 34, and wherein the means for determining the position of the feature of the face of the driver comprises means for determining a position of eyes of the driver.

Example 36 includes the subject matter of any of Examples 34 and 35, and wherein the means for determining the position of the eyes of the driver comprises means for determining a midpoint between the eyes of the driver in the captured image.

Example 37 includes the subject matter of any of Examples 34-36, and wherein the means for determining the position of the eyes of the driver relative to the mirror comprises means for determining a distance between the camera and the eyes of the driver.

Example 38 includes the subject matter of any of Examples 34-37, and wherein the means for determining the angle between the eyes of the driver, the mirror, and the ideal normal of the mirror comprises means for determining a distance between the eyes of the driver and the mirror; means for determining an angle between the camera, the eyes of the driver, and the mirror based on the determined distance between the eyes of the driver and the mirror; and means for determining an angle between the eyes of the driver, the mirror, and the ideal normal based on the determined angle between the camera, the eyes of the driver, and the mirror.

Example 39 includes the subject matter of any of Examples 34-38, and wherein the means for determining the distance between the eyes of the driver and the mirror comprises means for determining a distance, D, according to $D=\sqrt{C^2+E^2-2CE\cos(\theta_e+\theta_c)}$, wherein D is the distance between the eyes of the driver and the mirror; C is a distance between the camera and the mirror; E is a distance between the eyes of the driver and the camera; $\theta_e$ is an angle between a hypothetical normal extending from the eyes of the driver toward a direction of the camera, the eyes of the driver, and the camera; and $\theta_c$ is an angle between a hypothetical normal extending from the camera toward a direction of the eyes of the driver, the camera, and the mirror.

Example 40 includes the subject matter of any of Examples 34-39, and wherein the means for determining the angle between the camera, the eyes of the driver, and the mirror comprises means for determining an angle, $\theta_d$, according to $$\theta_d = \cos^{-1}\left(\frac{E^2 + D^2 - C^2}{2ED}\right),$$

wherein $\theta_d$ is the angle between the camera, the eyes of the driver, and the mirror; D is a distance between the eyes of the driver and the mirror; C is a distance between the camera and the mirror; E is a distance between the eyes of the driver and the camera; and $\cos^{-1}(\ )$ is an inverse cosine function.

Example 41 includes the subject matter of any of Examples 34-40, and wherein the means for determining the angle between the eyes of the driver, the mirror, and the ideal normal comprises means for determining an angle, $\theta_0$, according to $\theta_0=\theta_e+\theta_d$, wherein $\theta_0$ is the angle between the eyes of the driver, the mirror, and the ideal normal; $\theta_e$ is an angle between a hypothetical normal extending from the eyes of the driver toward a direction of the camera, the eyes of the driver, and the camera; and $\theta_d$ is an angle between the camera, the eyes of the driver, and the mirror.

Example 42 includes the subject matter of any of Examples 34-41, and wherein the configuration data further identifies a position of the driver's seat of the vehicle relative to at least one of the camera or the mirror.

Example 43 includes the subject matter of any of Examples 34-42, and wherein the means for adjusting the orientation of the mirror comprises means for adjusting an angle of the mirror relative to a current position of the mirror.

Example 44 includes the subject matter of any of Examples 34-43, and wherein the means for adjusting the orientation of the mirror comprises means for rotating the mirror an angle equal to half the determined angle.

Example 45 includes the subject matter of any of Examples 34-44, and wherein the means for adjusting the orientation of the mirror comprises means for rotating the mirror along a horizontal plane defined by the mirror.

Example 46 includes the subject matter of any of Examples 34-45, and further comprising means for tilting the mirror along a plane perpendicular to the horizontal plane.

Example 47 includes the subject matter of any of Examples 34-46, and wherein the imaginary line is parallel to a longitudinal axis of the vehicle.

Example 48 includes the subject matter of any of Examples 34-47, and further comprising means for capturing, by the camera of the vehicle, the image of the driver.

The invention claimed is:

1. An in-vehicle computing system of a vehicle for mirror adjustment, the in-vehicle computing system comprising:
    an image analysis module to determine a position of a feature of a face of a driver of the vehicle in an image captured by a camera of the vehicle; and
    a mirror adjustment module to (i) determine a position of the feature of the face of the driver relative to a mirror of the vehicle based on the captured image and configuration data that identifies a location of the camera relative to the mirror, (ii) determine an angle between the feature of the face of the driver, the mirror, and an ideal normal of the mirror, and (iii) adjust, by one or more signals supplied to a movement device of the mirror, an orientation of the mirror by an angle equal to half the determined angle;
    wherein the ideal normal of the mirror is an imaginary line normal to the mirror and extending therefrom when the mirror is positioned in a reference position.

2. The in-vehicle computing system of claim 1, wherein to determine the position of the feature of the face of the driver comprises to determine a position of eyes of the driver.

3. The in-vehicle computing system of claim 2, wherein to determine the position of the eyes of the driver comprises to determine a midpoint between the eyes of the driver in the captured image.

4. The in-vehicle computing system of claim 2, wherein to determine the position of the eyes of the driver relative to the mirror comprises to determine a distance between the camera and the eyes of the driver.

5. The in-vehicle computing system of claim 2, wherein to determine the angle between the eyes of the driver, the mirror, and the ideal normal of the mirror comprises to:
    determine a distance between the eyes of the driver and the mirror;
    determine an angle between the camera, the eyes of the driver, and the mirror based on the determined distance between the eyes of the driver and the mirror; and
    determine an angle between the eyes of the driver, the mirror, and the ideal normal based on the determined angle between the camera, the eyes of the driver, and the mirror.

6. The in-vehicle computing system of claim 5, wherein to determine the distance between the eyes of the driver and the mirror comprises to determine a distance, D, according to $D = \sqrt{C^2 + E^2 - 2CE\cos(\theta_e + \theta_c)}$, wherein:
    D is the distance between the eyes of the driver and the mirror;
    C is a distance between the camera and the mirror;
    E is a distance between the eyes of the driver and the camera;
    $\theta_e$ is an angle between a hypothetical normal extending from the eyes of the driver toward a direction of the camera, the eyes of the driver, and the camera; and
    $\theta_c$ is an angle between a hypothetical normal extending from the camera toward a direction of the eyes of the driver, the camera, and the mirror.

7. The in-vehicle computing system of claim 6, wherein to determine the angle between the camera, the eyes of the driver, and the mirror comprises to determine an angle, $\theta_d$, according to $$\theta_d = \cos^{-1}\left(\frac{E^2 + D^2 - C^2}{2ED}\right),$$

wherein:
    $\theta_d$ is the angle between the camera, the eyes of the driver, and the mirror;
    D is a distance between the eyes of the driver and the mirror;
    C is a distance between the camera and the mirror;
    E is a distance between the eyes of the driver and the camera; and
    $\cos^{-1}(\ )$ is an inverse cosine function.

8. The in-vehicle computing system of claim 7, wherein to determine the angle between the eyes of the driver, the mirror, and the ideal normal comprises to determine an angle, $\theta_o$, according to $\theta_o = \theta_e + \theta_d$, wherein:
    $\theta_o$ is the angle between the eyes of the driver, the minor, and the ideal normal;
    $\theta_e$ is an angle between a hypothetical normal extending from the eyes of the driver toward a direction of the camera, the eyes of the driver, and the camera; and
    $\theta_d$ is an angle between the camera, the eyes of the driver, and the mirror.

9. The in-vehicle computing system of claim 1, wherein the configuration data further identifies a position of the driver's seat of the vehicle relative to at least one of the camera or the mirror.

10. The in-vehicle computing system of claim 1, wherein to adjust the orientation of the mirror comprises to rotate the mirror along a horizontal plane defined by the mirror.

11. The in-vehicle computing system of claim 10, wherein the mirror adjustment module is further to tilt the mirror along a plane perpendicular to the horizontal plane.

12. The in-vehicle computing system of claim 1, wherein the imaginary line is parallel to a longitudinal axis of the vehicle.

13. One or more non-transitory machine-readable storage media comprising a plurality of instructions stored thereon that, in response to execution by a computing device, cause the computing device to:
    determine a position of a feature of a face of a driver of a vehicle in an image captured by a camera of the vehicle;
    determine a position of the feature of the face of the driver relative to a mirror of the vehicle based on configuration data of the vehicle and the captured image, wherein the configuration data identifies a location of the camera relative to the mirror;
    determine an angle between the feature of the face of the driver, the mirror, and an ideal normal of the mirror, wherein the ideal normal is an imaginary line normal to the mirror and extending therefrom when the mirror is positioned in a reference position; and
    adjust an orientation of the mirror by an angle equal to half the determined angle.

14. The one or more non-transitory machine-readable storage media of claim 13, wherein to determine the position of the feature of the face of the driver comprises to determine a position of eyes of the driver.

15. The one or more non-transitory machine-readable storage media of claim 14, wherein to determine the angle between the eyes of the driver, the mirror, and the ideal normal of the mirror comprises to:
determine a distance between the eyes of the driver and the mirror;
determine an angle between the camera, the eyes of the driver, and the mirror based on the determined distance between the eyes of the driver and the mirror; and
determine an angle between the eyes of the driver, the mirror, and the ideal normal based on the determined angle between the camera, the eyes of the driver, and the mirror.

16. The one or more non-transitory machine-readable storage media of claim 15, wherein to determine the distance between the eyes of the driver and the mirror comprises to determine a distance, D, according to $D = \sqrt{C^2+E^2-2CE\cos(\theta_e+\theta_c)}$, wherein:
D is the distance between the eyes of the driver and the mirror;
C is a distance between the camera and the mirror;
E is a distance between the eyes of the driver and the camera;
$\theta_e$ is an angle between a hypothetical normal extending from the eyes of the driver toward a direction of the camera, the eyes of the driver, and the camera; and
$\theta_c$ is an angle between a hypothetical normal extending from the camera toward a direction of the eyes of the driver, the camera, and the mirror.

17. The one or more non-transitory machine-readable storage media of claim 16, wherein to determine the angle between the camera, the eyes of the driver, and the mirror comprises to determine an angle, $\theta_d$, according to $$\theta_d = \cos^{-1}\left(\frac{E^2 + D^2 - C^2}{2ED}\right),$$

wherein:
$\theta_d$ is the angle between the camera, the eyes of the driver, and the mirror;
D is a distance between the eyes of the driver and the mirror;
C is a distance between the camera and the mirror;
E is a distance between the eyes of the driver and the camera; and
$\cos^{-1}(\ )$ is an inverse cosine function.

18. The one or more non-transitory machine-readable storage media of claim 17, wherein to determine the angle between the eyes of the driver, the mirror, and the ideal normal comprises to determine an angle, $\theta_0$, according to $\theta_0=\theta_e+\theta_d$, wherein:
$\theta_0$ is the angle between the eyes of the driver, the minor, and the ideal normal;
$\theta_e$ is an angle between a hypothetical normal extending from the eyes of the driver toward a direction of the camera, the eyes of the driver, and the camera; and
$\theta_d$ is an angle between the camera, the eyes of the driver, and the mirror.

19. The one or more non-transitory machine-readable storage media of claim 13, wherein to adjust the orientation of the mirror comprises to adjust an angle of the mirror relative to a current position of the mirror.

20. The one or more non-transitory machine-readable storage media of claim 13, wherein to adjust the orientation of the mirror comprises to rotate the mirror along a horizontal plane defined by the mirror.

21. The one or more non-transitory machine-readable storage media of claim 13, wherein the imaginary line is parallel to a longitudinal axis of the vehicle.

22. A method for mirror adjustment by an in-vehicle computing system of a vehicle, the method comprising:
determining, by the in-vehicle computing system, a position of a feature of a face of a driver of the vehicle in an image captured by a camera of the vehicle;
determining, by the in-vehicle computing system, a position of the feature of the face of the driver relative to a mirror of the vehicle based on configuration data of the vehicle and the captured image, wherein the configuration data identifies a location of the camera relative to the mirror;
determining, by the in-vehicle computing system, an angle between the feature of the face of the driver, the mirror, and an ideal normal of the mirror, wherein the ideal normal is an imaginary line normal to the mirror and extending therefrom when the mirror is positioned in a reference position; and
adjusting, by the in-vehicle computing system, an orientation of the mirror by an angle equal to half the determined angle.

23. The method of claim 22, wherein determining the position of the feature of the face of the driver comprises determining a position of eyes of the driver.

24. The method of claim 23, wherein determining the angle between the eyes of the driver, the mirror, and the ideal normal of the mirror comprises:
determining a distance between the eyes of the driver and the mirror;
determining an angle between the camera, the eyes of the driver, and the mirror based on the determined distance between the eyes of the driver and the mirror; and
determining an angle between the eyes of the driver, the mirror, and the ideal normal based on the determined angle between the camera, the eyes of the driver, and the mirror.

* * * * *